United States Patent Office 3,743,562
Patented July 3, 1973

3,743,562
PRODUCTION OF HEAT SEALS
Raymond Harold Phipps, Bristol, England, assignor to The Robinson Waxed Paper Company Limited, Bristol, England
Filed Dec. 4, 1970, Ser. No. 95,043
Claims priority, application Great Britain, Dec. 15, 1969, 61,057/69
Int. Cl. G01n 19/04
U.S. Cl. 156—378      4 Claims

ABSTRACT OF THE DISCLOSURE

Apparatus for testing heat sealing conditions between sheet materials has a pair of co-operating heat sealing elements rotatably mounted about separate relatively radially displaceable axes. The temperature of the elements can be varied, and variable speed drive means allows the dwell time to be varied. The loading can be varied by adjustable stop means which limits the maximum displacement of the axes. Alternatively or additionally variable means can be provided for applying a force tending to urge the axes together. There may also be adjustable stop means for providing a minimum limit to the radial distance between the axes.

---

This invention relates to the production of a heat seal between superimposed layers of heat sealable sheet material, and in particular to the production of such a seal by gripping the sheets between a pair of heat sealing elements which are heated to the required temperature.

In the production of such heat seals, not only the temperature of the elements is important, but also the pressure between them (the loading) and their period of contact with the sheets (the dwell time). The control of other parameters may also be important in particular cases.

In order to produce a satisfactory heat seal on a production basis it is desirable to know in advance the critical parameters required for a particular production run so that the machine can be pre-set accordingly. Hitherto it has been customary to set the production machine to what is thought to be the approximately correct values, and then to make the necessary adjustments during the early runs. Production machines however generally do not have provision for readily adjusting and measuring the critical parameters, and in many other ways the production machines are not suited for carrying out preliminary experiments on the material. The previous procedure has therefore been time consuming and wasteful of material.

It is an object of the present invention to provide apparatus for testing heat sealing conditions between sheet materials which will lend itself to quick and easy testing of individual specimens on a laboratory or other pre-production scale. The apparatus is particularly suited for determining the critical parameters for production machines of the type wherein heat sealing is effected by passing superimposed layers of the heat sealable material between rotating heat seal elements which simultaneously contact opposite sides of the sheets to produce the heat seal.

According to the present invention there is provided apparatus for testing heat sealing conditions between sheet materials, which apparatus comprises a frame, a pair of co-operating heat sealing elements rotatably mounted to the frame about separate relatively radially displaceable axes, variable speed drive means for rotating the elements about their axes at a predetermined speed, variable temperature control means for maintaining the heat sealing elements at a predetermined temperature, and variable loading means for opposing displacement of the axes away from each other, the heat sealing elements being arranged so that on rotation they pass opposite each other in heat sealing relationship.

The apparatus, preferably also includes means for indicating and measuring relative radial displacement between the axes, and adjustable stop means for providing a minimum limit to the radial distance between the axes.

Preferably each heat sealing element comprises an electrically heated axially extending elongate bar projecting radially of the axis, and having a radially outwardly facing heat seal surface, the rotation of the two elements being arranged so that the heat seal surfaces of the bars periodically pass opposite each other in heat sealing relationship.

In a preferred form one heat sealing element is journalled directly to the frame and the other heat sealing element is journalled at opposite ends to a pair of members movably mounted to the frame, the variable loading means and adjustable stop means being arranged to act on the movable members, and distance gauges being provided acting between the movable members and fixed portions of the frame to indicate and measure relative radial displacement of the axes.

The variable loading means preferably includes means for applying a predetermined force tending to urge the axes towards each other. The variable loading means may alternatively or additionally include adjustable stop means for providing a maximum limit to the radial distance between the axes.

In order that the invention may be more clearly understood, a preferred embodiment will now be described with reference to the accompanying drawings, wherein.

Figure 1:
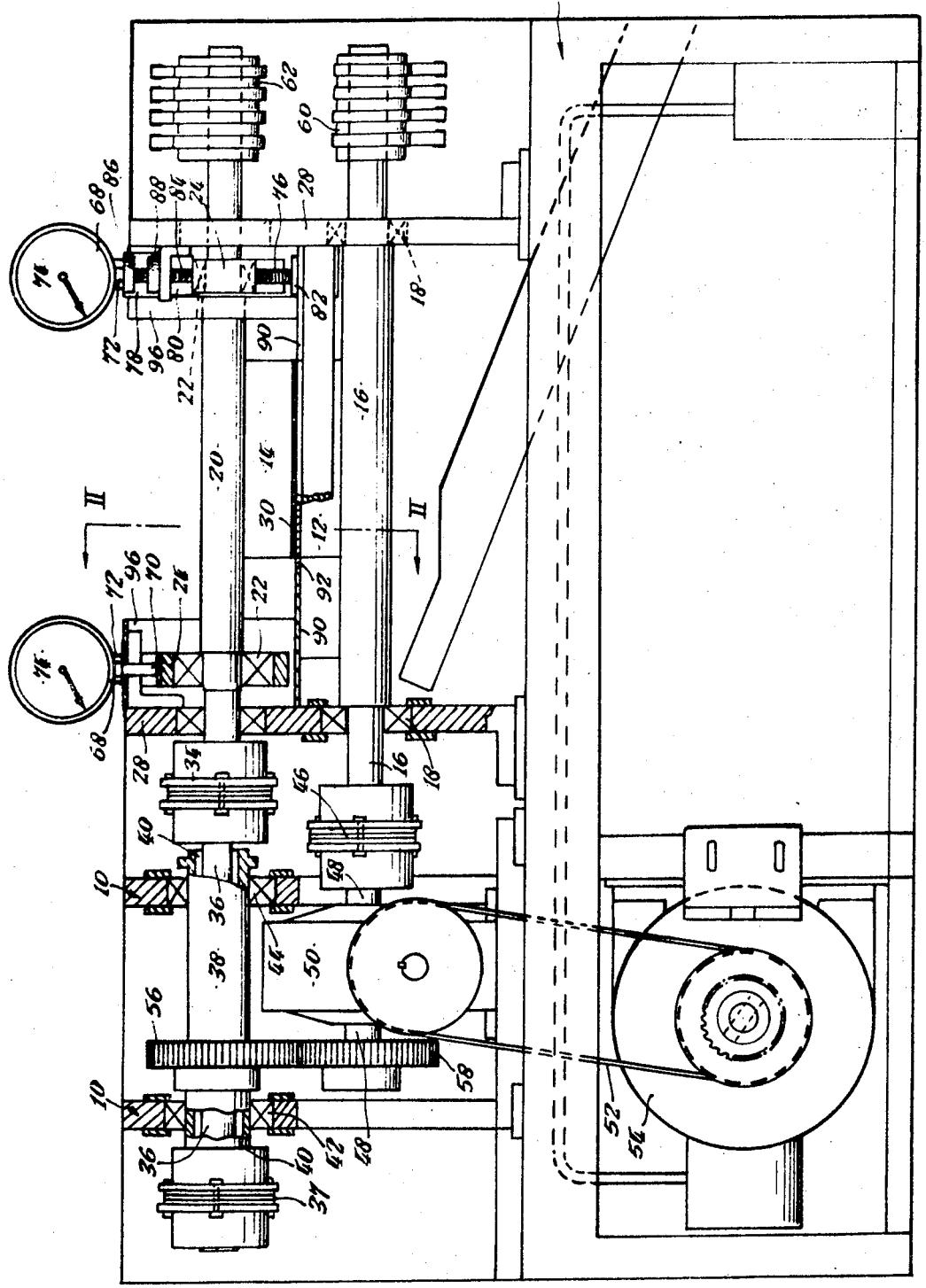
FIG. 1 is a front elevation partly in section of the operative part of the apparatus with its front cover removed.
Figure 2:
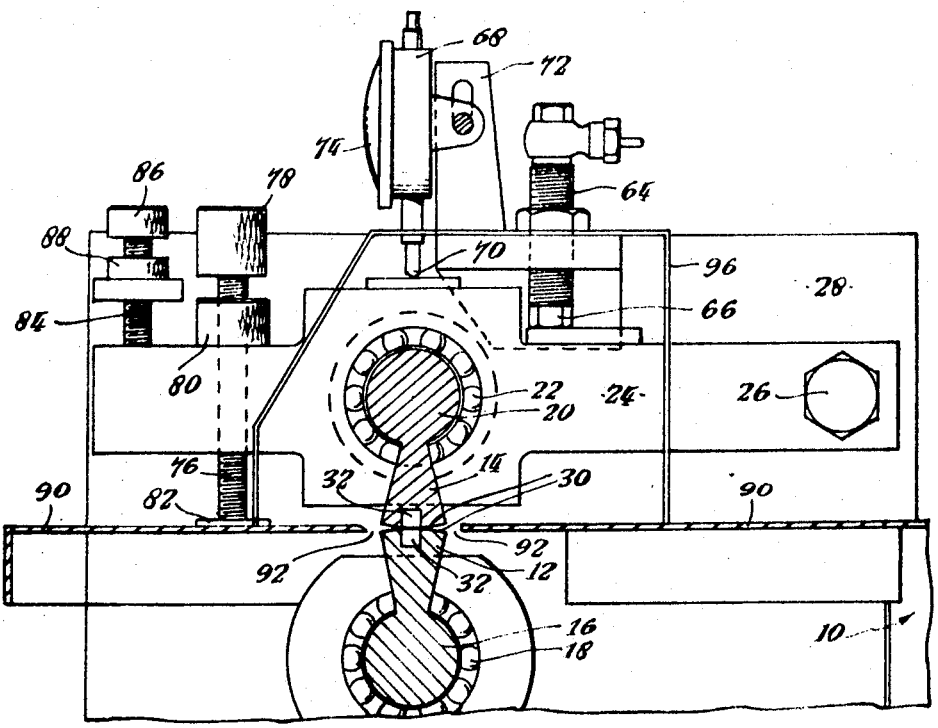
FIG. 2 is a section on the line II—II of FIG. 1.

Referring to the drawings, and firstly to FIGS. 1 and 2, the working part of the apparatus comprises a fixed frame generally designated 10 and a pair of co-operating heat sealing elements 12, 14 rotatably mounted to the frame. The element 12 comprises an axially extending elongate bar fast with a shaft 16 which is journalled at its ends through ball bearings 18 directly to the frame 10. The sealing element 14 comprises an axially extending elongate bar fast with a shaft 20 which is journalled at its ends through ball bearings 22 to a pair of arms 24. The arms 24 are pivotally mounted at 26 to respective side plates 28 which form part of the frame 10. Thus the two shafts, 16, 20 are relatively radially displaceable by pivoting of the arms 24 about the pivot points 26. The heat sealing elements 12, 14 are each provided with a fast response temperature sensing probe (not shown).

The working faces 30 of two sealing elements have arcuate cross sections with centres of curvature coincident with their axes of rotation. Each working face is divided into two parallel regions separated by a recessed portion 32. Furthermore the working faces are transversely ribbed, the two sealing elements being arranged so that the peaks and troughs of the ribs of one element exactly match the troughs and peaks of the ribs of the other element. In this way a sheet of material passing between the two working surfaces is provided with a pair of parallel spaced apart crimped regions.

The drive means for rotating the elements about their axes can best be seen in FIG. 1. The shaft 20 extends at one end through one of the side plates 28 with sufficient clearance to allow for its desired range of displacement relative to the shaft 16, and terminates in a first universal joint 34. From the joint 34 a shaft 36 continues to a second universal joint 37. From the joint 37 a sleeve 38 extends back around the shaft 36 with substantial annular clearance 40 and is journalled through bearings 42, 44 to the frame 10. The shaft 16 terminates at one end in a universal joint 46 from the other side of which extends a shaft 48 which passes through a gear-box 50. The shaft 48 is driven through the gear-box and a timing belt 52 by an electric motor 54 mounted to the frame. Identical intermeshing sprocket wheels 56, 58 fast with the sleeve 38 and shaft 48 respectively cause the shaft 20 to be driven at precisely the same speed as the shaft 16 and in the opposite direction. The two sealing elements are arranged so that their working surfaces pass adjacent each other in sealing relationship (as shown in FIG. 2) once every revolution. The universal joints ensure that vibration from the drive means does not upset the register of the two sealing elements. Furthermore, the arrangement of the shaft 36 within the sleeve 38 allows the required amount of displacement in the shaft 20 without affecting the intermeshing of the sprocket wheels 56, 58.

At the other end of each shaft 16, 20 there is provided electrical brush gear 60, 62 and four slip rings, by means of two of which electricity is supplied through the shafts to the sealing elements for heating them to the required temperature, and two of which provide means for feeding the control signal from the temperature sensing probes (not shown).

A pair of hydraulic jacks 64 are mounted one to each side plate 28 so that their movable plungers 66 engage identical places on the upper surfaces of the two arms 24. Thus, hydraulic pressure in the jacks bears upon the arms in a direction tending to urge the shaft 20 towards the shaft 16. A pair of conventional distance gauges 68 are also mounted one to each side plate 28 so that their probes 70 engage identical places on the upper surfaces of the arms 24. Each gauge is adjustably mounted on a post 72 and has an accurately calibrated dial 74 by means of which the displacement of the arm 24 can be measured. The probe 70 lies precisely over the axis of rotation of the shaft 20 so that the dial 74 gives a direct reading of the amount of the displacement.

Two screw-threaded bolts 76 pass vertically one through each arm 24 and are provided at their upper ends with knurled heads 78 and have also lock-nuts 80 so that the bolts can be adjusted and locked in any desired position. At its lower end, each bolt 76 bears upon a fixed portion 82 of the frame 10. The bolts thus act as a stop means providing a minimum limit to the distance between the two shafts 16, 20. Two second screw-threaded bolts 84 having knurled heads 86 and lock-nuts 88 are mounted one to each side plate 28 so that the lower end of each bolt can engage the upper surface of an arm 24. The bolts 84 can provide a maximum limit to the distance between the two shafts, and in co-operation with the bolts 76 can be used to lock the arms 24 in any desired position. If not required, the bolts 84 can be retracted so that their ends cannot engage the arms 24.

Material being passed between the sealing elements 12, 14 is guided on a horizontal plate 90 mounted to the frame, the plate having an aperture 92 in the region of sealing. For safety, a protective shroud 94 is hinged to the frame between the side plates 28, and can be swung from a safety position where it rests on side supporting members 96 to an open position wherein it lies clear of the sealing elements and allows access thereto. By means of an electrical contact (not shown) the seal bars cease to revolve as soon as the guard is lifted slightly.

Figure 3:
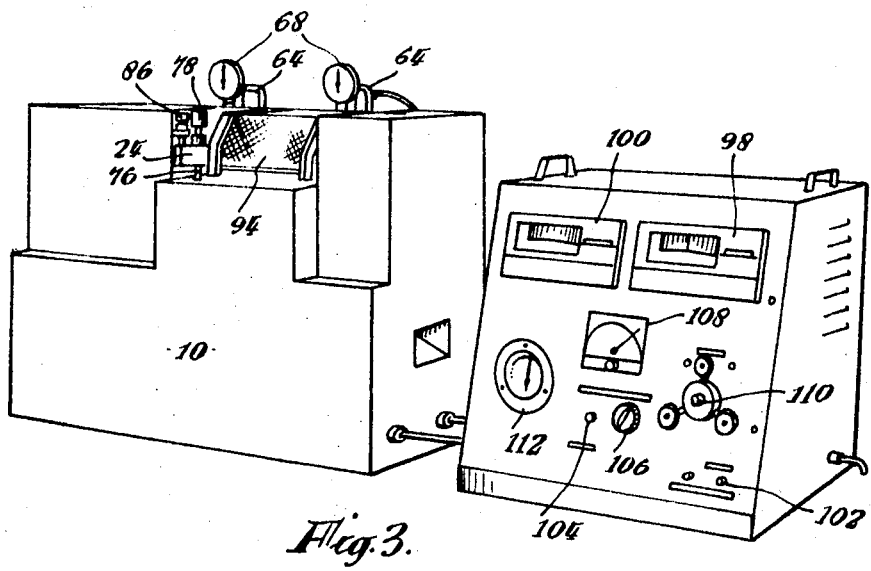
FIG. 3 is a perspective view of the complete apparatus.

As shown in FIG. 3 the complete apparatus includes a separate unit housing the hydraulic and electric controls and joined to the main unit through appropriate hydraulic and electrical connections. The controls are of a conventional kind and need not be described in detail. They comprise a first temperature control unit 98 for the bottom sealing element and a second temperature control unit 100 for the top sealing element, a first on/off switch 102 for the electric power, a second on/off switch 104 for the drive motor 54, a variable speed control 106 for the motor 54 together with a meter 108 which indicates the speed of rotation in revolutions per minute of the shafts 16, 20, and an electrically operated hydraulic pump (not shown) whose pressure is varied by rotation of the control knob 110 and indicated in the pressure gauge 112 which is calibrated to read directly the seal bars loading reacting against the test material.

To operate the apparatus, the two switches are switched on and the temperature control units, the hydraulic jaw loading, and the shaft rotation speed are adjusted to the required values. Then the two bolts 76 are adjusted so that by the slightest flicker of the needles on the two dials 74 it can be seen that the sealing elements 12, 14 are just touching as they pass adjacent each other. The two dials 74 are then set to read zero. If it is desired to have a working clearance between the sealing elements then the bolts 76 are adjusted to raise the arms 24 the desired amount as shown on the dials 74. The lock-nuts 80 are then screwed down to ensure that this minimum position is maintained. The superimposed sheets of material to be sealed are then fed along the plate 90 between the sealing elements 12, 14. For each rotation of the elements a pair of parallel crimped sealing regions are produced and the effectiveness of any seal produced can be tested after the material has emerged from the other side of the elements.

The depth of the seal impression can be measured by reading the deflection produced on the dial 74 as the material passes between the sealing elements, and subtracting this value from the known total thickness of the superimposed layers. If desired, the locking screws 84 can be put into engagement with the arms 24 after they have been set by the bolts 76 thus locking them in the minimum position. This obviously by-passes the hydraulic loading jack and produces a seal of predetermined thickness rather than a seal produced by a predetermined loading. Obviously, if the seal produced is unsatisfactory, any of these various controls can be adjusted to any point within their respective ranges. The dwell time of the two sealing elements during sealing is of course directly controlled by the rate of rotation of the two shafts 16, 20. It has been found that this provides a far higher degree of accuracy in determining the dwell time than is the case with reciprocating sealing elements. Furthermore, of course, the results can easily be reproduced by a production sealing machine which uses rotary sealing elements. A typical range of values for each of the controls is as follows:

(i) Top and bottom sealing element temperatures 0° to 400° centigrade (independently);

(ii) Seal bar loading 15 to 140 lbs. weight;

(iii) Sealing element rotation speed 20 to 200 r.p.m. (plus or minus 2%).

The sort of range of relative displacement between the shafts 16, 20 would of course depend on the thickness of material being heat sealed but ample allowance can be made in the apparatus for displacement, and the bodily adjustment of the gauge 68 on the post 72 is provided to allow for considerable variations in the thickness of material being heat sealed. Of course, any of these ranges can be changed according to particular requirements.

What I claim and desire to secure by Letters Patent is:

1. Apparatus for testing heat sealing conditions between sheet materials, which apparatus comprises a frame, a pair of co-operating heat sealing elements rotatably mounted to the frame about separate relatively radially displaceable axes and arranged so that on rotation they periodically pass opposite each other in heat sealing relationship, one of the heat sealing elements being journalled at opposite ends to a pair of members movably mounted to the frame, variable speed drive means for rotating the elements about their axes at a predetermined speed, variable temperature control means for maintaining the heat sealing elements at a predetermined temperature, variable loading means acting on said pair of movable members for applying a predetermined force opposing displacement of the axes away from each other, first and second adjustable stop means for acting on said pair of movable members to provide if required maximum and minimum limits to the radial distance between the axes, and means for indicating and measuring relative radial displacement between the axes.

2. Apparatus according to claim 1 wherein each heat sealing element comprises an electrically heated axially extending elongate bar projecting radially of the axis and having a radially outwardly facing heat seal surface.

3. Apparatus according to claim 1 wherein the indicating and measuring means comprises separate direct reading distance gauges acting between the movable members and fixed portions of the frame.

4. Apparatus according to claim 1 wherein the variable loading means comprises a pair of hydraulic jacks acting one on each of the movable members to apply thereto a known hydraulic pressure.

References Cited
UNITED STATES PATENTS 2,958,366   11/1960   Conti _____ 156—378
3,444,732   5/1969   Robbins _____ 156—378 X GEORGE F. LESMES, Primary Examiner M. E. McCAMISH, Assistant Examiner U.S. Cl. X.R.

73—150; 116—114 R, 115; 156—64, 351, 358, 582, 583